US008168070B2

(12) United States Patent
Gisch et al.

(10) Patent No.: US 8,168,070 B2
(45) Date of Patent: May 1, 2012

(54) METHOD FOR REMOVING CHROMIUM FROM WATER USING ION EXCHANGE RESINS INCLUDING INTERPENETRATING POLYMER NETWORKS

(75) Inventors: Daryl J. Gisch, Midland, MI (US); Jing Jin, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 323 days.

(21) Appl. No.: 12/634,709

(22) Filed: Dec. 10, 2009

(65) Prior Publication Data

US 2010/0176059 A1    Jul. 15, 2010

Related U.S. Application Data

(60) Provisional application No. 61/144,761, filed on Jan. 15, 2009, provisional application No. 61/152,341, filed on Feb. 13, 2009.

(51) Int. Cl.
C02F 1/42    (2006.01)
(52) U.S. Cl. .................... 210/684; 210/688; 210/913
(58) Field of Classification Search ................. 210/684, 210/688, 913
See application file for complete search history.

(56) References Cited

U.S. PATENT DOCUMENTS

| | | | |
|---|---|---|---|
| 2,614,099 A | 10/1952 | Bauman et al. | |
| 3,306,859 A * | 2/1967 | Sloan et al. | 252/387 |
| 3,317,313 A | 5/1967 | Buggs et al. | |
| 3,664,950 A * | 5/1972 | Saraceno et al. | 210/662 |
| 4,036,751 A | 7/1977 | Orita et al. | |
| 4,192,921 A | 3/1980 | Dales | |
| 4,246,386 A | 1/1981 | Howell et al. | |
| 4,256,840 A | 3/1981 | Meitzner et al. | |
| 4,283,499 A | 8/1981 | Howell | |
| 4,419,245 A | 12/1983 | Barret et al. | |
| 4,444,961 A | 4/1984 | Timm | |
| 4,479,877 A | 10/1984 | Guter | |
| 4,525,483 A | 6/1985 | Grier et al. | |
| 4,564,644 A | 1/1986 | Harris | |
| 4,568,700 A | 2/1986 | Warshawsky et al. | |
| 4,582,859 A | 4/1986 | Lein, Jr. et al. | |
| 4,623,706 A | 11/1986 | Timm et al. | |
| 4,666,673 A | 5/1987 | Timm | |
| 4,944,878 A | 7/1990 | Lockridge | |
| 5,134,169 A | 7/1992 | Green et al. | |
| 5,141,965 A | 8/1992 | Pike | |
| RE34,112 E | 10/1992 | Ma | |
| 5,231,115 A | 7/1993 | Harris | |
| 5,244,926 A | 9/1993 | Harris et al. | |
| 5,248,435 A | 9/1993 | Morita et al. | |
| 5,834,524 A | 11/1998 | Bloodworth et al. | |
| 6,059,975 A | 5/2000 | Alexandratos et al. | |
| 6,251,996 B1 | 6/2001 | Stahlbush | |
| 6,448,299 B1 | 9/2002 | Brown et al. | |
| 6,756,462 B2 | 6/2004 | Pafford et al. | |
| 6,924,317 B2 | 8/2005 | Feistel | |
| 7,282,153 B2 | 10/2007 | Barrett et al. | |
| 2002/0042450 A1 | 4/2002 | Lailach et al. | |
| 2003/0018091 A1 | 1/2003 | Pafford et al. | |
| 2004/0256597 A1 | 12/2004 | Barrett et al. | |
| 2006/0264521 A1 | 11/2006 | Podszun et al. | |
| 2007/0241057 A1 | 10/2007 | Klipper et al. | |
| 2008/0237133 A1 | 10/2008 | Dale et al. | |
| 2008/0289949 A1 | 11/2008 | Harris et al. | |

FOREIGN PATENT DOCUMENTS

| | | |
|---|---|---|
| EP | 0098130 | 1/1984 |
| EP | 1479440 | 5/2004 |
| WO | 2008118972 | 10/2008 |
| WO | 2008144115 | 11/2008 |

OTHER PUBLICATIONS

Harris, et al., U.S. Appl. No. 12/634,708, filed Dec. 10, 2009.
Sengupla, Arup K., Ion Exchange Technology, Advance in Pollution Control, (3) 115-147, Published Jul. 2006.
Greig, J. A., "Ion Exchange Developments and Applications", Proceedings of IEX '1996, 182, 388-395, Published Jan. 1996.
Greig, J. A., "Ion Exchange at the Millennuim", Imperial College Press, Jul. 2000, pp. 77-84.
F. Hefflerich, Ion Exchange (McGraw-Hill 1962), p. 35-36, Published Jan. 1962.
Gode, et al., "Removal of Cr (VI) from Aqueous Solution by Two Lewatit-anion Exchange Resins", Journal of Hazardous Material B119, (2005) 175-182, Published Jan. 2005.
Narin, et al., "A Novel Solid Phase Extraction Procedure on Amberlite XAD-1180 for Speciation of CR (III), CR (VI) and Total Chromium in Environmental and Pharmaceutical Samples", Journal of Hazardous Materials, 150 (2008) 453-458, Published Jan. 2008.
Pehlvan, et al., "Sorption of CR(VI) Ions on Two Lewatit-anion Exchange Resins and Their Quantitative Determination Using UV-visible Spectophotometer", Journal of Hazardous Materials (2008), Published Jan. 2008.
Dabrowski, et al, "Selective Removal of the Heavy Metal Ions from Waters and Industrial Wastewaters by Ion-exchange Method", Chemosphere 56 (2004) 91-106, Published Jan. 2004.
"DOWEX Resins for Separation of Chromium Ions From Water", Dow Water Solutions, The Dow Chemical Company, (1995-2008).
Gisch, U.S. Appl. No. 12/701,644, filed Feb. 8, 2010.
PUROLITE Product Data Sheet.
PUROLITE perchlorate removal; product brochure.
Rohm & Haas Amberlite PWA2 Produce Brochure.
Calgon Carbon Resins for perchlorate removal; product brochure.
IP.com An improved Strong Base Anion Resin for Both the More Selective Uptake and Regeneration of Perchlorate (pub.Aug. 29, 2007).
Gu, Brown, et al. "Regeneration of Perchlorate . . . " Environ Sci Technology, 2001, 35, pp. 3363-3368, Published Jul. 2001.

(Continued)

Primary Examiner — Matthew Savage
(74) Attorney, Agent, or Firm — Edward W. Black

(57) ABSTRACT

The invention includes ion exchange resins and their use in the removal of chromium from water. In one embodiment, the invention comprises a method for removing chromium from a water source by contacting the water with an ion exchange resin, wherein the ion exchange resin comprises particles of a crosslinked copolymer comprising: an interpenetrating polymer network (IPN) of at least two polymer components each having a styrenic content greater than 50 molar percent, and a quaternary ammonium functionality.

9 Claims, No Drawings

OTHER PUBLICATIONS

Gu, Brown, et al. "Sorption and Desorption of Perchlorate and U(VI) by Strong-Base Anion Exchange Reins" Environ. Sci. Technology, 2005,39, p. 901, Published Dec. 2004.

Gu, Brown, et al., "Selective Anion Exchange Resins for the Removal of Perchlorate from Groundwater" Envinronmental Sciences Division Publication No. 4863, published Feb. 1999.

Boodoo, "POU/POE Removal of Perchlorate" Water Conditioning & Purification, Aug. 2003.

Chapters 11, 12, 15 and 16 of "Perchlorate in the Environment" ed. Urbanski, Kluwer Academic/Plenum Publishers, NY 2000, Published Jan. 2000.

DOWEX Resins for Perchlorate, Dow Water & Process Solutions.

DOWEX1, High Capacity Strong Base Anion Exchange Resin for Regenerable and Non-Regenerable Applications.

DOWEX NSR-1, "A strong base, Nitrate Selective, Anion Exchange Resin."

DOWEX PSR-2, "A strong base anion exchange resin designed for the selective removal of trace contaminants from potable water."

DOWEX PSR-3, "A strong base anion exchange resin designed for the selective removal of trace contaminants from potable water."

Suresh Subramonian, Anion-exchange resins from vinylbenzyl chloride: control of hydrolysis during polymerization, Reactive & Functional Polymers 29 (1996) 129-133, Published Jan. 1996.

Vaidya, S.V., et al., "Weak Base Anion Exchange Resin: Simplification of Amination Process and Control on SDC", Ion Exchange Advances, Proceedings of IEX 92, p. 112-119, Published Jan. 1992.

Ichiro Noda,et al., (1963), 66(6), 857-60 "Amination of Chloromethylation polystyrene", J. Chem Soc. Japan, (1963), vol. 66, No. 6 pp. 857-860, Published Jan. 1963.

Jones, Griffin D., Chloromethylation of Polystyrene, Industrial and Engineering Chemistry, vol. 44, No. 11, pp. 2686-2693, Published Nov. 1952.

Stephenson, Richard M. Journal of Chemical Engineering Data, 1993, 38 (4), 625-629, Published Jan. 1993.

Mosier-Boss, "Use of Raman Spec. to Evaluate the Selectivity of Bifunctional Anion Exchange Resins for Perchlorate" Abstract only, published Feb. 2008.

* cited by examiner

METHOD FOR REMOVING CHROMIUM FROM WATER USING ION EXCHANGE RESINS INCLUDING INTERPENETRATING POLYMER NETWORKS

CROSS REFERENCE STATEMENT

This application claims the benefit of U.S. Provisional Application No. 61/144,761, filed Jan. 15, 2009, and U.S. Provisional Application No. 61/152,341, filed Feb. 13, 2009, which are incorporated herein by reference.

BACKGROUND OF THE INVENTION (1) Field of the Invention

The invention relates to ion exchange resins and their use in the removal of chromium from water.

(2) Description of the Related Art

Chromium is present in many water sources including ground and surface water. Hexavalent chromium, in its various forms (e.g. $HCrO_4^-$, $CrO_4^{-2}$, and $Cr_2O_7^{-2}$), is soluble over a wide range of pH values. As a consequence, the number of effective chromium removal techniques is limited. One conventional method is treatment with ion exchange resin such as DOWEX™ 1 brand ion exchange resin, a strong base, gel-type resin comprising a crosslinked styrene-divinylbenzene copolymer matrix with quaternary ammonium functionality (i.e. functional groups produced via reaction between a chloromethylated styrene-divinylbenzene copolymer matrix and a trimethyl amine). Other examples of ion exchange resins used in chromium removal include: DOWEX™ MAC-3 brand ion exchange resin, a macroporous resin including an acrylic matrix with carboxylic functional groups; DOWEX™ SAR brand ion exchange resin, a gel-type resin including a styrene-divinylbenzene matrix with quaternary ammonium functionality (i.e. functional groups produced via reaction between a chloromethylated styrene-divinylbenzene copolymer matrix and a dimethylethanol amine); and DOWEX™ M4195 brand ion exchange resin, a macroporous chelating resin including a styrene-divinylbenzene matrix with chelation groups produced via reaction with bis-picolylamine—all commercially available from The Dow Chemical Company. Other types of ion exchange resin are also known for use in chromium removal, e.g. phenol-formaldehyde functionalized with secondary amines, and epoxy polyamines.

In the presence of competing ions (e.g. chloride, sulfate, bicarbonate, etc.), the chromium removal capacity of an ion exchange resin is typically improved at acidic pH values, e.g. typically below a pH of 6.3. As a consequence, conventional treatment regimes involve reducing the pH of the water source prior to treatment with ion exchange resin. See for example: (1) Ion Exchange Technology—Advances in Pollution Control, ed. A. Sengupta, Technomic Publishing Co. (1995), Lancaster Pa. (ISBN No. 1-56676-241-3), see specifically Chapter 3, "Chromate Ion Exchange"; and (2) Ion Exchange Developments and Applications, Proceedings of IEX '96, ed. J. A. Greig. The Royal Society of Chemistry (1996), Cambridge UK (ISBN 0-85404-726-3), see specifically pg. 388-395, "Kinetics of Chromic Acid Removal by Anion Exchange" by H. K. S. Tan. The step of reducing the pH of a water source prior to ion exchange treatment is both time consuming and costly.

BRIEF SUMMARY OF THE INVENTION

The invention includes ion exchange resins and their use in the removal of chromium from water. In one embodiment, the invention comprises a method for removing chromium from a water source by contacting the water with an ion exchange resin, wherein the ion exchange resin comprises particles of a crosslinked copolymer comprising: an interpenetrating polymer network (IPN) of at least two polymer components each having a styrenic content greater than 50 molar percent, and a quaternary ammonium functionality. Many additional embodiments are disclosed.

DETAILED DESCRIPTION OF THE INVENTION

The present invention includes ion exchange resins and their use in the removal of chromium from water. The term "ion exchange resin" is intended to broadly describe crosslinked copolymer particles which have been chemically treated to attach or form functional groups which have a capacity for ion exchange. The term "functionalize" refers to processes (e.g. sulfonation, haloalkylation, amination, etc.) for chemically treating crosslinked copolymer resins to attach ion exchange groups, i.e. "functional groups". The crosslinked copolymer serves as the substrate or polymeric backbone whereas the functional group serves the active site capable of exchanging ions with a surrounding fluid medium. The present invention is specifically directed toward a class of ion exchange resins comprising crosslinked copolymers including interpenetrating polymer networks (IPN). The term "interpenetrating polymer network" is intended to describe a material containing at least two polymers, each in network form wherein at least one of the polymers is synthesized and/or crosslinked in the presence of the other. The polymer networks are physically entangled with each other and in some embodiments may be also be covalently bonded. Characteristically, IPNs swell but do not dissolve in solvent nor flow when heated. Ion exchange resins including IPNs have been commercially available for many years and may be prepared by known techniques involving the preparation of multiple polymer components. Examples of such resins along with techniques for their preparation are provided in: U.S. Pat. Nos. 4,419,245; 4,564,644; 4,582,859; 5,834,524; 6,251,996; 6,924,317 and US 2002/0042450 —all of which are incorporated herein in their entirety. Commercial examples of IPN gel-type ion exchange resins are described in: Ion Exchange at the Millennium—Proceedings of IEX 2000, ed. J A Greg, Imperial College Press, London (2000).

As used herein, the term "polymer component" refers to the polymeric material resulting from a distinct polymerization step. For example, in a preferred embodiment of the present invention, the subject IPN ion exchange resins are "seeded" resins; that is, the resin is formed via a seeded process wherein a copolymer (preferably crosslinked) seed is first formed and is subsequently imbibed with monomer and subsequently polymerized. Additional monomer may be subsequently added during the polymerization process (i.e. "continuous addition" or "con-add"). The formation of the seed particles constitutes a distinct polymer component. Similarly, the process step of imbibing and polymerizing a monomer mixture into the seed constitutes yet another polymer component. If used, the subsequent continuous addition of a monomer mixture commonly used to "grow up" the seed also constitutes a distinct polymer component. Except as specifically described herein, the constituents of each polymer component may be the same or different. Moreover, the monomer mixture used during a polymerization step need not be homogeneous; that is, the ratio and type of monomers may be varied. The term "polymer component" is not intended to mean that the resulting resin have any particular morphology other than an interpenetrating polymer network; however, the present resins may have a "core-shell" type structure as is described in U.S. Pat. No. Re 34,112, the entire contents of which are incorporated herein by reference. Each polymer component of the present invention preferably contributes more than about 5 weight percent, and more preferably at least 10 weight percent of the final IPN copolymer particle. Typically, the resins of the present invention comprise two or three polymer components, e.g. a seed component, an imbibe component, and/or a continuous addition component. Those skilled in the art will appreciate that different or additional combinations of polymer components may be used, e.g., multiple con-add components may be utilized. The first, second, third, etc., polymer components do not necessarily correspond to an order of addition. That is, the "first polymer component" does not necessarily correspond to the polymer component which is first polymerized, e.g., a seed particle. The terms "first," "second," etc. are only used to distinguish one component from another, not to designate an order of addition.

As indicated, the resins of the present invention are preferably made by way of a seeded polymerization. Seeded polymerizations, also known as continuous or semi-continuous staged polymerizations, are generally described in U.S. Pat. Nos. 4,419,245; 4,564,644; and 5,244,926—the entire contents of which are incorporated herein by reference. A seeded polymerization process typically adds monomers in two or more increments. Each increment is followed by complete or substantial polymerization of the monomers therein before adding a subsequent increment. A seeded polymerization is advantageously conducted as a suspension polymerization wherein monomers or mixtures of monomers and seed particles are dispersed and polymerized within a continuous suspending medium. In such a process, staged polymerization is readily accomplished by forming an initial suspension of monomers, wholly or partially polymerizing the monomers to form seed particles, and subsequently adding remaining monomers in one or more increments. Each increment may be added at once or continuously. Due to the insolubility of the monomers in the suspending medium and their solubility within the seed particles, the monomers are imbibed by the seed particles and polymerized therein. Multi-staged polymerization techniques can vary in the amount and type of monomers employed for each stage as well as the polymerizing conditions employed.

The seed particles employed may be prepared by known suspension polymerization techniques. In general the seed particles may be prepared by forming a suspension of a first monomer mixture in an agitated, continuous suspending medium as described by F. Helfferich in Ion Exchange, (McGraw-Hill 1962) at pp. 35-36. The first monomer mixture comprises: 1) a first monovinylidene monomer, 2) a first crosslinking monomer, and 3) an effective amount of a first free-radical initiator. The suspending medium may contain one or more suspending agents commonly employed in the art. Polymerization is initiated by heating the suspension to a temperature of generally from about 50-90° C. The suspension is maintained at such temperature or optionally increased temperatures of about 90-150° C. until reaching a desired degree of conversion of monomer to copolymer. Other suitable polymerization methods are described in U.S. Pat. Nos. 4,444,961; 4,623,706; 4,666,673; and 5,244,926—each of which is incorporated herein in its entirety.

The monovinylidene monomers employed herein are well-known and reference is made to Polymer Processes, edited by Calvin E. Schildknecht, published in 1956 by Interscience Publishers, Inc., New York, Chapter III, "Polymerization in Suspension" at pp. 69-109. Table II (pp. 78-81) of Schildknecht lists diverse types of monomers which are suitable in practicing the present invention. Of the monomers listed, water-insoluble monovinylidene monomers including the monovinylidene aromatics such as styrene and substituted styrene are preferred. The term "substituted styrene" includes substituents of either/or both the vinylidene group and phenyl group of styrene and include: vinyl naphthalene, alpha alkyl substituted styrene (e.g., alpha methyl styrene) alkylene-substituted styrenes (particularly monoalkyl-substituted styrenes such as vinyltoluene and ethylvinylbenzene) and halo-substituted styrenes, such as bromo or chlorostyrene and vinylbenzylchloride. Other applicable monomers include monovinylidene non-styrenics such as: esters of $\alpha,\beta$-ethylenically unsaturated carboxylic acids, particularly acrylic or methacrylic acid, methyl methacrylate, isobornylmethacrylate, ethylacrylate, and butadiene, ethylene, propylene, acrylonitrile, and vinyl chloride; and mixtures of one or more of said monomers. Preferred monovinylidene monomers include styrene and substituted styrene such as ethylvinylbenzene. The term "monovinylidene monomer" is intended to include homogeneous monomer mixtures and mixtures of different types of monomers, e.g. styrene and isobornylmethacrylate. The seed polymer component preferably comprises a styrenic content greater than 50 molar percent, and more preferably greater than 75 molar percent (based upon the total molar content). The term "styrenic content" refers to the quantity of monovinylidene monomer units of styrene and/or substituted styrene utilized to form the copolymer. "Substituted styrene" includes substituents of either/or both the vinylidene group and phenyl group of styrene as described above. In preferred embodiments, the first monomer mixture used to form the first polymer component (e.g. seed) comprises at least 75 molar percent, and in some embodiments at least 85 molar percent of styrene.

Examples of suitable crosslinking monomers (i.e., polyvinylidene compounds) include polyvinylidene aromatics such as divinylbenzene, divinyltoluene, divinylxylene, divinylnaphthalene, trivinylbenzene, divinyldiphenyl ether, divinyldiphenylsulfone, as well as diverse alkylene diacrylates and alkylene dimethacrylates. Preferred crosslinking monomers are divinylbenzene, trivinylbenzene, and ethylene glycol dimethacrylate. The terms "crosslinking agent," "crosslinker" and "crosslinking monomer" are used herein as synonyms and are intended to include both a single species of crosslinking agent along with combinations of different types of crosslinking agents. The proportion of crosslinking monomer in the copolymer seed particles is preferably sufficient to render the particles insoluble in subsequent polymerization steps (and also on conversion to an ion-exchange resin), yet still allow for adequate imbibition of an optional phase-separating diluent and monomers of the second monomer mixture. In some embodiments, no crosslinking monomer will be used. Generally, a suitable amount of crosslinking monomer in the seed particles is minor, i.e., desirably from about 0.01 to about 5 molar percent, preferably from about 0.1 to about 2.5 molar percent based on total moles of monomers in the first monomer mixture used to prepare the seed particles. In a preferred embodiment, the first polymer component (e.g. seed) is derived from polymerization of a first monomer mixture comprising at least 85 molar percent of styrene (or substituted styrene such as ethylvinylbenzene) and from 0.01 to about 5 molar percent of divinylbenzene.

Polymerization of the first monomer mixture may be conducted to a point short of substantially complete conversion of the monomers to copolymer or alternatively, to substantially complete conversion. If incomplete conversion is desired, the resulting partially polymerized seed particles advantageously contain a free-radical source therein capable of initiating further polymerization in subsequent polymerization stages. The term "free-radical source" refers to the presence of free-radicals, a residual amount of free-radical initiator or both, which is capable of inducing further polymerization of ethylenically unsaturated monomers. In such an embodiment of the invention, it is preferable that from about 20 to about 95 weight percent of the first monomer mixture, based on weight of the monomers therein, be converted to copolymer and more preferably from about 50 to about 90 weight percent. Due to the presence of the free radical source, the use of a free-radical initiator in a subsequent polymerization stage would be optional. For embodiments where conversion of the first monomer mixture is substantially complete, it may be necessary to use a free-radical initiator in subsequent polymerization stages.

The free-radical initiator may be any one or a combination of conventional initiators for generating free radicals in the polymerization of ethylenically unsaturated monomers. Representative initiators are UV radiation and chemical initiators, such as azo-compounds including azobisisobutyronitrile; and peroxygen compounds such as benzoyl peroxide, t-butylperoctoate, t-butylperbenzoate and isopropylpercarbonate. Other suitable initiators are mentioned in U.S. Pat. Nos. 4,192,921; 4,246,386; and 4,283,499—each of which is incorporated in its entirety. The free-radical initiators are employed in amounts sufficient to induce polymerization of the monomers in a particular monomer mixture. The amount will vary as those skilled in the art can appreciate and will depend generally on the type of initiators employed, as well as the type and proportion of monomers being polymerized. Generally, an amount of from about 0.02 to about 2 weight percent is adequate, based on total weight of the monomer mixture.

The first monomer mixture used to prepare the seed particles is advantageously suspended within an agitated suspending medium comprising a liquid that is substantially immiscible with the monomers, (e.g. preferably water). Generally, the suspending medium is employed in an amount from about 30 to about 70 and preferably from about 35 to about 50 weight percent based on total weight of the monomer mixture and suspending medium. Various suspending agents are conventionally employed to assist with maintaining a relatively uniform suspension of monomer droplets within the suspending medium. Illustrative suspending agents are gelatin, polyvinyl alcohol, magnesium hydroxide, hydroxyethylcellulose, methylhydroxyethylcellulose methylcellulose, and carboxymethyl methylcellulose. Other suitable suspending agents are disclosed in U.S. Pat. No. 4,419,245. The amount of suspending agent used can vary widely depending on the monomers and suspending agents employed. Latex inhibitors such as sodium dichromate may be used to minimize latex formation.

The seed particles may be of any convenient size. In general, the seed particles desirably have a volume average particle diameter of from about 75 to about 1000 microns, preferably from about 150 to about 800 microns, and more preferably from about 200 to about 600 microns. The distribution of the particle diameters may be Gaussian or uniform (e.g. at least 90 volume percent of the particles have a particle diameter from about 0.9 to about 1.1 times the volume average particle diameter).

As previously described, copolymer particles may be prepared by providing a plurality of the seed particles and thereafter, adding a second monomer mixture such that the mixture is imbibed by the seed particles and polymerization is conducted therein. This step is preferably conducted as a batch-seeded process or as an in situ batch-seeded process, as described below. The second monomer mixture may also be added intermittently or continuously under polymerizing conditions, such as described in U.S. Pat. No. 4,564,644.

In the so-called "batch-seeded" process, seed particles comprising from about 10 to about 50 weight percent of the copolymer are preferably suspended within a continuous suspending medium. A second monomer mixture containing a free radical initiator is then added to the suspended seed particles, imbibed thereby, and then polymerized. Although less preferred, the seed particles can be imbibed with the second monomer mixture prior to being suspended in the continuous suspending medium. The second monomer mixture may be added in one amount or in stages. The second monomer mixture is preferably imbibed by the seed particles under conditions such that substantially no polymerization occurs until the mixture is substantially fully imbibed by the seed particles. The time required to substantially imbibe the monomers will vary depending on the copolymer seed composition and the monomers imbibed therein. However, the extent of imbibition can generally be determined by microscopic examination of the seed particles, or suspending media, seed particles and monomer droplets. The second monomer mixture desirably contains from about 0.5 to about 25 molar percent, preferably from about 2 to about 17 molar percent and more preferably 2.5 to about 8.5 molar percent of crosslinking monomer based on total weight of monomers in the second monomer mixture with the balance comprising a monovinylidene monomer; wherein the selection of crosslinking monomer and monovinylidene monomer are the same as those described above with reference to the preparation of the first monomer mixture, (i.e. seed preparation). As with the seed preparation, the preferred monovinylidene monomer includes styrene and/or a substituted styrene. In a preferred embodiment, the second polymer component (i.e. second monomer mixture, or "imbibed" polymer component) has a styrenic content greater than 50 molar percent, and more preferably at least 75 molar percent (based upon the total molar content of the second monomer mixture). In a preferred embodiment, the second polymer component is derived from polymerization of a second monomer mixture comprising at least 75 molar percent of styrene (and/or substituted styrene such as ethylvinylbenzene) and from about 1 to 20 molar percent divinylbenzene.

In an in-situ batch-seeded process, seed particles comprising from about 10 to about 80 weight percent of the IPN copolymer product are initially formed by suspension polymerization of the first monomer mixture. The seed particles can have a free-radical source therein as previously described, which is capable of initiating further polymerization. Optionally, a polymerization initiator can be added with the second monomer mixture where the seed particles do not contain an adequate free radical source or where additional initiator is desired. In this embodiment, seed preparation and subsequent polymerization stages are conducted in-situ within a single reactor. A second monomer mixture is then added to the suspended seed particles, imbibed thereby, and polymerized. The second monomer mixture may be added under polymerizing conditions, but alternatively may be added to the suspending medium under conditions such that substantially no polymerization occurs until the mixture is substantially fully imbibed by the seed particles. The composition of the second monomer mixture preferably corresponds to the description previously given for the batch-seeded embodiment.

Conditions employed to polymerize ethylenically unsaturated monomers are well known in the art. Generally, the monomers are maintained at a temperature of from about 50-150° C. for a time sufficient to obtain a desired degree of conversion. Typically, an intermediate temperature of from about 60-80° C. is maintained until conversion of monomer to copolymer is substantially complete and thereafter the temperature is increased to complete the reaction. The resulting porous copolymer particles may be recovered from the suspending medium by conventional methods.

The copolymer particles of the present invention are preferably prepared by suspension polymerization of a finely divided organic phase comprising monovinylidene monomers such as styrene, crosslinking monomers such as divinylbenzene, a free-radical initiator and, optionally, a phase-separating diluent. While the crosslinked copolymer may be macroporous or gel-type, gel-type copolymers are preferred. The terms "gel-type" and "macroporous" are well-known in the art and generally describe the nature of the copolymer particle porosity. The term "macroporous" as commonly used in the art means that the copolymer has both macropores and mesopores. The terms "microporous," "gellular," "gel" and "gel-type" are synonyms that describe copolymer particles having pore sizes less than about 20 Angstroms (Å), while macroporous copolymer particles have both mesopores of from about 20 Å to about 500 Å and macropores of greater than about 500 Å. Gel-type and macroporous copolymer particles, as well as their preparation are further described in U.S. Pat. Nos. 4,256,840 and 5,244,926—the entire contents of which are incorporated herein by reference.

By way of convention, the polymer components of the subject ion exchange resin have been described in terms of the monomer content from which they are derived. With respect to the polymers described, the monomer content serves as an accurate proxy for the resulting polymer—including both content and ratios. That is, substantially all the monomer constituents polymerize with no substantive change in ratio. Thus, the reference to the styrenic content of a polymer component will be understood to describe the molar ratio of styrene and/or substituted styrene within the monomer mixture from which the polymer component is derived.

The subject copolymer particles preferably have a bead structure with a median particle diameter from 300 to 800 microns. The crosslinked copolymer particles may have a Gaussian particle size distribution but preferably have a relatively uniform particle size distribution, i.e. "monodisperse" that is, at least 90 volume percent of the beads have a particle diameter from about 0.9 to about 1.1 times the volume average particle diameter.

The subject copolymer includes a quaternary ammonium functionality comprising a nitrogen atom bonded to a benzyl carbon of the copolymer and three alkyl groups, wherein each alkyl group independently comprises from 1 to 8, and preferably from 2 to 6 carbon atoms. In one group of embodiments, each alkyl group comprises from 1 to 8 carbon atoms and the total number of carbon atoms for all three alkyl groups is at least 5 (e.g. dimethylisopropyl), more preferably at least 6 (e.g. triethyl, tripropyl, etc.), and still more preferably at least 12 (e.g. tributyl). By way of illustration, Formula 1 provides a structural formula of a repeating unit of styrenic polymer including a quaternary ammonium functionality.

Formula 1:

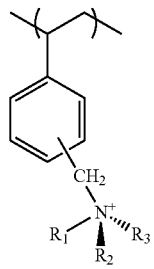

wherein the benzyl carbon is located at the meta, ortho or para position (typically including a combination of species but with predominantly para substitution) of the aromatic ring; and $R_1$, $R_2$ and $R_3$ are each independently selected from alkyl groups comprising from 1 to 8 carbon atoms, preferably from 2 to 6 carbon atoms. Each alkyl group ($R_1$, $R_2$ and $R_3$) may independently be: straight (e.g. methyl, ethyl, propyl, butyl, pentyl, etc.) or branched (e.g. isopropyl, isobutyl, etc.), and may be unsubstituted or substituted (e.g. substituted with such groups as a hydroxyl or alkoxy group). In a preferred embodiment, the three alkyl groups ($R_1$, $R_2$ and $R_3$) are independently selected from unsubstituted alkyl groups which may be straight or branched. In another embodiment, the three alkyl groups are collectively selected from: triethyl, tripropyl, tributyl, tripentyl, trihexyl, and dimethylisopropyl. In yet another preferred embodiment, $R_1$, $R_2$ and $R_3$ are each a n-butyl group, i.e. the amine functional group is a tri-n-butyl amine. In still another embodiment, the subject copolymer includes "mixed species" of quaternary ammonium functionalities; e.g. an ammonium functionality wherein $R_1$, $R_2$ and $R_3$ are each n-butyl groups, and a separate ammonium functionality wherein at least one of $R_1$, $R_2$ and $R_3$ is selected from a group other than n-butyl, such as isopropyl.

The subject copolymer may be functionalized via conventional processes such as haloalkylation (e.g. chloromethylation) followed by amination (e.g. via reaction with a tertiary amine such as tributyl amine)—see for example U.S. Pat. No. 6,924,317, the entire contents of which are incorporated herein by reference. While a wide variety of known haloalkylation techniques may be used, chloromethylation is preferred. The specific means and conditions for chloromethylating are not particularly limited and many applicable techniques are documented in the literature. Chloromethylation is typically conducted by combining the copolymer with a chloromethylation reagent in the presence of a catalyst at a temperature of from about 15 to 100° C., preferably 35 to 70° C. for about 1 to 8 hours. A preferred chloromethylation reagent is chloromethyl methyl ether (CMME); however, other reagents may be used including CMME-forming reactants such as the combination of formaldehyde, methanol and hydrogen chloride or chlorosulfonic acid (as described in US 2004/0256597), or hydrogen chloride with methylated formalin. The chloromethylating reagent is typically combined with the copolymer in an amount of from about 0.5 to 20, preferably about 1.5 to 8 mole of CMME per mole of copolymer. While less preferred, other chloromethylation reagents may be used including but not limited to: bis-chloromethyl ether (BCME), BCME-forming reactants such as formaldehyde and hydrogen chloride, and long chain alkyl chloromethyl ethers as described in U.S. Pat. No. 4,568,700.

Catalyst useful for conducting chloromethylation reactions are well known and are often referred to in the art as "Lewis acid" or "Friedel-Crafts" catalyst. Nonlimiting examples include: zinc chloride, zinc oxide, ferric chloride, ferric oxide, tin chloride, tin oxide, titanium chloride, zirconium chloride, aluminum chloride and sulfuric acid along with combinations thereof. Halogens other than chloride may also be used in the preceding examples. A preferred catalyst is ferric chloride. The catalyst is typically used in an amount corresponding to about 0.01 to 0.2, preferably from about 0.02 to 0.1 mole catalyst per mole of copolymer repeating unit. Catalyst may be used in combination with optional catalyst adjuncts such as calcium chloride and activating agents such as silicon tetrachloride. More than one catalyst may be used to achieve the desired chloromethylation reaction profile.

Solvents and/or swelling agents may also be used in the chloromethylation reaction. Examples of suitable solvents including but are not limited to one or more of: an aliphatic hydrocarbon halides such as ethylene dichloride, dichloropropane, dichloromethane, chloroform, diethyl ether, dipropyl ether, dibutyl ether and diisoamyl ether. When CMME is used as the chloromethylation agent, such solvents and/or swelling agents are often not necessary.

Once haloalkylated, the copolymer may be aminated via conventional processes such as described in US 2004/0256597; U.S. Pat. Nos. 4,564,644 or 6,924,317—the entire contents of which are incorporated herein by reference. Amination may be performed by combining the haloalkylated resin (preferably pre-washed) with an amine solution, (preferably at a ratio of approximately 0.5 to 1.3 mole of amine per mole of benzylhalide group) at an elevated temperature (e.g. typically from 25-150° C., but more preferably from 40-85° C.) for several hours (e.g. typically for 2 to 10 hours). After which, the resulting solution may be cooled and the aminated resin decanted, washed and optionally treated in dilute hydrochloric acid at elevated temperature (e.g. 50-90° C.). In the present invention, the amine species is preferably a tertiary amine, e.g. tertiary alkyl amine including three alkyl groups selected from groups corresponding to $R_1$, $R_2$ and $R_3$ as previously described with reference to Formula 1. Mixed species of the subject tertiary amines may be utilized, as may mixtures including other species of amines (e.g. secondary amines). The amine solution may comprise a slurry solvent of alcohol (e.g. methanol) and optionally water; and may optionally include a swelling agent such as methylal or ethylene dichloride. The amine solution may optionally include an inorganic salt such as sodium chloride. Additionally, the pH of the amine solution may be adjusted to 7 or slightly alkaline.

In one embodiment, the copolymer is reacted with CMME and the resulting chloromethylated copolymer is washed and subsequently combining with tri-n-butyl amine in a ratio of from about 0.9 to 1.3 mole amine per mole of benzyl chloride group of the copolymer, within an alcohol-based solvent comprising from about 35 to 75 weight percent methanol, 20 to 50 weight percent methylal, and 5 to 30 weight percent water. The reaction mixture may be agitated for about 4 to 10 hours and maintained at a temperature of about 65 to 85° C. and a pH of about 8.5 to 12 for the majority of the reaction time period. The pH of the reaction mixture can be maintained by periodic addition of base, such as sodium hydroxide, sodium carbonate, calcium hydroxide, calcium oxide or potassium hydroxide. In the case of sparingly soluble bases (e.g. calcium hydroxide) or weaker bases (e.g. sodium carbonate), the pH of the reaction mixture may be maintained by the addition of all or a majority of the base at the beginning of the amination. In order to improve conversion and avoid copolymer bead breakage, the pH of the reaction mixture should be monitored and pH excursions outside of the designated range should be minimized.

While the present method generally involves the step of contacting a water source with the subject ion exchange resin (i.e. functionalized copolymer), several specific embodiments are included within the scope of the invention. For example, in several embodiments the ion exchange resin may be regenerated after being loaded with chromium. Such embodiments are consistent with water sources used in industrial processes which include high concentrations (e.g. above about 50,000 ug/L) of chromium wherein chromium may be recovered for subsequent use. In other embodiments, the ion exchange resin is not regenerated but is disposed of (e.g. burial in a landfill) or destroyed (e.g. incinerated) once loaded with chromium. These non-regenerated embodiments are consistent with treatment of water sources including relatively low concentrations of chromium, (e.g. less than about 50,000 ug/L and more commonly less than about 5000 ug/L), such as treatment of ground water, wastewater prior to discharge, and drinking water applications. In such embodiments, the treatment and handling of chromium containing regenerate liquid can be avoided. The apparatus or vessel containing the resin is not particularly limited and may vary upon the specific application, scale of operation, source of water and chromium concentration. Examples of applicable embodiments range from column-type beds including several cubic meters of ion exchange resin to disposable cartridges containing only a few kilograms of ion exchange resin.

The present invention may include the optional step of acidifying (reducing the pH) of the water source prior to contact with the ion exchange resin; however, in several embodiments the method includes the treatment of a water source at or above a pH of: 6, 6.5, 6.8, 7 and in some embodiments even 7.5 (regardless of whether the water source is subjected to pH adjustment). In other embodiments, the method excludes the step of reducing the pH of the water prior to contact with the ion exchange resin.

The term "water source" is intended to broadly describe aqueous-based liquids such as those associated with industrial, agricultural or manufacturing processes, municipal water sources and ground and surface waters (e.g. lakes, streams, rivers, run-off, aquifers, etc.). The present invention is particularly useful for treatment of water sources intended for potable and drinking water applications. In one embodiment, the water source has pre-treatment concentration of chromium from about 10-50,000 ug/L, and in another embodiment the water source has a pre-treatment concentration of chromium from about 10-5000 ug/L. The term "pre-treatment concentration" is intended to describe the chromium concentration of the water source prior to treatment pursuant to the subject method. In some embodiments, such water sources may be pretreated via other means prior to the subject method.

In one embodiment, the subject copolymer includes a quaternary ammonium functionality comprising a nitrogen atom bonded to a benzyl carbon of the copolymer and three n-butyl groups, i.e. "tri-n-butyl amine". This species of quaternary ammonium functionalized copolymer has an unexpectedly low selective for uranium ions as compared with other species of copolymer including quaternary ammonium functionalities. As a consequence, this species of quaternary ammonium functionalized copolymer may be preferred in applications where a water source includes uranium and chromium. Such copolymers are advantaged as they have a lower relative affinity for uranium; and as such, can often be more easily disposed of without special handling measures.

EXAMPLES

The following examples are intended to illustrate the invention and should not be construed as limiting the scope of the appended claims. Several ion exchange resins were tested under a variety of pH conditions using aqueous feed solutions comprising approximately: 2 mg/L chromium, 50 mg/L sodium sulfate, and 150 mg/L sodium chloride. The aqueous feed solutions were prepared using de-ionized water. A 1N NaOH solution was used to adjust pH.

Each resin was first rinsed and filtered. Approximately 1 g of each ion exchange resin was placed in an individual 1000 nil Erlenmeyer flask. A test solution (including 750 ml of Cr (VI)) was then added to each flask and stirred for several days until equilibrium was reached. The residual chromium of the test solution within each flask was then analyzed via inductively coupled plasma mass spectrometry. The chromium detection limit of the testing equipment was 0.01 mg/L. The specific pH and chromium concentration of each test solution along with the test duration and results are provided below in Table 1.

DOWEX™ 1, DOWEX™ PSR-2, and DOWEX™ PSR-3 brand ion exchange resins were all obtained from The Dow Chemical Company. DOWEX™ 1 brand resin is a strong base, gel-type resin comprising a crosslinked styrene-divinylbenzene copolymer matrix with quaternary ammonium functionality (i.e. functional groups resulting from amination with trimethyl amine). DOWEX™ PSR-2 brand resin is a strong base, gel-type resin comprising a crosslinked styrene-divinylbenzene copolymer matrix with quaternary ammonium functionality (i.e. functional groups resulting from amination with tri-n-butyl amine). DOWEX™ PSR-3 brand resin is a strong base, macroporous resin comprising a crosslinked styrene-divinylbenzene copolymer matrix with quaternary ammonium functionality (i.e. functional groups resulting from amination with tri-n-butyl amine).

Two sample IPN ion exchange resins (IPN Samples 1 & 2) were also used in the testing. Both Samples were strong base, gel-type resins comprising a crosslinked styrene-divinylbenzene copolymer matrix with quaternary ammonium functionality (i.e. functional groups resulting from amination with tri-n-butyl amine). Unlike the DOWEX™ brand ion exchange resin noted in the preceding paragraph, the IPN Sample resins were prepared using traditional "seeded" suspension polymerization techniques as previously described and as described in U.S. Pat. Nos. 4,564,644, 5,244,926 and 4,444,961. More specifically, gel-type crosslinked copolymer seeds having a mean particle diameter of 220 microns were prepared using a reactor apparatus generally described in U.S. Pat. No. 4,444,961 under reaction conditions generally described in example 3 of U.S. Pat. No. 5,244,926 using a first monomer mixture comprising approximately: 0.5 weight percent divinylbenzene, 0.4 weight percent ethylvinylbenzene with the balance of styrene.

The resulting crosslinked copolymer seeds were then used to prepare IPN copolymer beads according to the methods described in U.S. Pat. No. 4,564,644. Two IPN copolymers (Sample 1 & 2) were prepared according to similar formulations with the differences of Sample 2 indicated in parenthesis. More specifically, Sample 1 was prepared by adding approximately 23 parts by weight of the crosslinked copolymer seeds (Sample 2: approx. 17 parts by weight) to a stainless steel reactor equipped with an agitator and sufficient water to suspend the seed particles. Under agitation, a second monomer mixture was added to the reactor. The second monomer mixture comprised approximately 3 parts by weight divinylbenzene (Sample 2: approx. 3.5 parts by weight), 2.4 parts by weight of ethylvinylbenzene (Sample 2: approx. 2.8 parts by weight), 0.1 parts by weight t-butylperoctoate, 0.03 parts by weight t-butyl-perobenzoate, with the balance of styrene. 15 parts by weight of 0.75 wt % aqueous solution of methylhydroxyethylcellulose was also added to the mixture. Water was then added in an amount such that the total monomer/copolymer (i.e. copolymer seed and second monomer mixture) to aqueous phase weight ratio was approximately 1:1. The reaction mixture was heated to approximately 75-80° C. and maintained for approximately 3 hours after which time a third monomer mixture was added comprising: approximately 4 parts by weight divinylbenzene, 3 parts by weight of ethylvinylbenzene, with the balance of styrene. The third monomer mixture was fed at a constant rate into the reactor over approximately 10 hours. The reaction mixture was then heated to approximately 90° C. for an additional 1.5 hours and then raised to 110° C. for approximately 1.5 hours.

The approximate weight contribution of each polymer component to the resulting IPN copolymer of each Sample was as follows: Sample 1: 22% from the seed polymer component, 27% from the imbibe polymer component and 51% from the con-add polymer component. Sample 2: 20% from the seed polymer component, 25% from the imbibe polymer component and 55% from the con-add polymer component.

The two IPN copolymer samples were subsequently chloromethylated by combining approximately 100 parts by weight of each IPN copolymer sample with an access of chloromethyl methyl ether (approximately 500 to 650 parts by weight) in the presence of ferric chloride (approximately 8 to 11 parts by weight) and refluxed at temperature of approximately 50-60° C. for approximately 4 hours. 50 g portions of each of the resulting chloromethylated IPN copolymer samples were then washed and combined in a vessel with approximately 300 nil of a solvent comprising methanol/methylal/water (40/40/20 volume ratio). The IPN copolymer samples were allowed to equilibrate at ambient temperature for approximately 30 minutes after which 40 ml of tri-n-butyl amine was added along with 0.1 g caustic (beaded form). The vessel was sealed, heated to approximately 80° C. and shaken for approximately 6 hours. The vessel was then cooled, the resulting aminated IPN Sample ion exchange resins were filtered from the mixture, washed several times with de-ionized water, followed by several washes with 7% HCl solutions, and several final washes with de-ionized water.

TABLE 1

| Ion Exchange Resin | Aqueous test solution | | | |
|---|---|---|---|---|
| | Cr (2.3 mg/L) pH 4.5 (7 days) | Cr 2 mg/L pH 6.3 (2 days) | Cr 1.6 mg/L pH 7.2 (7 days) | Cr 2.1 mg/L pH 8.0 (7 days) |
| DOWEX ™ 1 | 0.1 | 0.03 | 0.02 | 0.03 |
| DOWEX ™ PSR-2 | 0.06 | 0.04 | 0.04 | 0.06 |
| DOWEX ™ PSR-3 | 0.6 | 0.3 | 0.07 | 0.03 |
| IPN Sample 1 | 0.1 | 0.01 | ND (<0.01) | ND (<0.01) |
| IPN Sample 2 | 0.1 | 0.02 | ND (<0.01) | ND (<0.01) |

As shown by the data of Table 1, the IPN Sample ion exchange sample resins demonstrated improved binding capacity for chromium over a wide range of pH values. Perhaps most unexpected, the subject IPN Sample resins demonstrated improved binding capacities at neutral and alkaline pH values.

While principles of the invention are amenable to various modifications and alternatives forms, particular species have been described by way of examples and detailed description. It should be understood that the intent of this description is not to limit the invention to the particular embodiments described, but rather to cover all modifications, equivalents, and alternatives falling within the spirit and scope of the disclosure. Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention. It will be understood that certain features and sub-combinations are of utility and may be employed without reference to other features and sub-combinations. References to ranges of numerical values expressly include the end points of such ranges. It will be appreciated that the crosslinked copolymers described herein may be further functionalized beyond the amination reaction described herein. For example, such copolymers may be further aminated with amine species other than those described, such as primary or secondary amines.

The invention claimed is:

1. A method for removing chromium from a water source having a chromium concentration from 10 ug/L to 5000 ug/L and a pH of at least 6.5; comprising the steps of: providing an ion exchange resin, wherein the ion exchange resin comprises particles of a crosslinked copolymer comprising: an interpenetrating polymer network (IPN) of at least two polymer components each having a styrenic content greater than 50 molar percent, and a quaternary ammonium functionality; and contacting the water source with the ion exchange resin.

2. The method of claim 1 wherein the crosslinked copolymer has a styrenic content of greater than 75 molar percent.

3. The method of claim 1 wherein the quaternary ammonium functionality comprises a nitrogen atom bonded to a benzyl carbon of the copolymer and three alkyl groups.

4. The method of claim 1 wherein the quaternary ammonium functionality comprises a nitrogen atom bonded to a benzyl carbon of the copolymer and three alkyl groups, wherein each alkyl group independently comprises from 2 to 6 carbon atoms.

5. The method of claim 1 wherein the quaternary ammonium functionality comprises a nitrogen atom bonded to a benzyl carbon of the copolymer and three alkyl groups, wherein the alkyl groups are selected from: triethyl, tripropyl, tributyl, tripentyl, trihexyl, and dimethylisopropyl.

6. The method of claim 1 wherein the crosslinked copolymer is comprises a gel-type copolymer.

7. The method of claim 1 wherein the particles of crosslinked copolymer comprise a bead structure having a median particle diameter and wherein at least 90 volume percent of the beads have a particle diameter from about 0.9 to about 1.1 times the volume average particle diameter.

8. The method of claim 1 wherein the water source has a pH of 7 or greater.

9. The method of claim 1 wherein the method excludes the step of reducing the pH of the water prior to contacting with the ion exchange resin.

* * * * *